United States Patent
Dasasathyan et al.

(10) Patent No.: US 11,003,826 B1
(45) Date of Patent: May 11, 2021

(54) AUTOMATED ANALYSIS AND OPTIMIZATION OF CIRCUIT DESIGNS

(71) Applicant: Xilinx, Inc., San Jose, CA (US)

(72) Inventors: Srinivasan Dasasathyan, Secunderabad (IN); Padmini Gopalakrishnan, Hyderabad (IN); Vishal Tripathy, Chandanagar (IN); Vikas N. Vedamurthy, Hyderabad (IN); Sumit Nagpal, Hyderabad (IN)

(73) Assignee: XILINX, INC., San Jose, CA (US)

( * ) Notice: Subject to any disclaimer, the term of this patent is extended or adjusted under 35 U.S.C. 154(b) by 72 days.

(21) Appl. No.: 16/397,501

(22) Filed: Apr. 29, 2019

(51) Int. Cl.
 *G06F 30/392* (2020.01)
 *G06F 30/327* (2020.01)
 *G06F 111/04* (2020.01)

(52) U.S. Cl.
 CPC .......... *G06F 30/392* (2020.01); *G06F 30/327* (2020.01); *G06F 2111/04* (2020.01)

(58) Field of Classification Search
 CPC .......... G06F 30/27; G06F 30/30; G06F 30/34; G06F 30/347; G06F 30/39; G06F 30/323; G06F 30/327; G06F 30/3323; G06F 30/392; G06F 30/394; G06F 2111/04
 USPC .......................... 716/116–117, 102–104, 110
 See application file for complete search history.

(56) References Cited

U.S. PATENT DOCUMENTS

| | | | |
|---|---|---|---|
| 2018/0129771 A1* | 5/2018 | Hashimoto | G06F 30/34 |
| 2018/0260498 A1* | 9/2018 | Nagaraja | G06F 30/3323 |

OTHER PUBLICATIONS

Kapre, Nachiket et al., "InTime: A Machine Learning Approach for Efficient Selection of FPGA CAD Tool Parameters," FPGA '15, Feb. 22, 2015, pp. 1-4.

* cited by examiner

*Primary Examiner* — Paul Dinh
(74) *Attorney, Agent, or Firm* — Crawford Maunu PLLC (57) ABSTRACT

Strategies are stored in a memory arrangement, and each strategy includes a set of parameter settings for a design tool. The design tool identifies a set of features of an input circuit design and applies classification models to the input circuit design. Each classification model indicates one the strategies, and application of each classification model indicates a likelihood that use of the strategy would improve a metric of the input circuit design based on the set of features of the input circuit design. One strategy of the plurality of strategies is selected based on the likelihood that use of the one strategy would improve the metric of the input circuit design, and the design tool is configured with the set of parameter settings of the one strategy. The design tool then processes the input circuit design into implementation data that is suitable for making an integrated circuit (IC).

18 Claims, 4 Drawing Sheets

AUTOMATED ANALYSIS AND OPTIMIZATION OF CIRCUIT DESIGNS

TECHNICAL FIELD

The disclosure generally relates to optimizing circuit designs.

BACKGROUND

Timing closure is one example of an important objective for Electronic Design Automation (EDA) tools in processing circuit designs targeted to application specific integrated circuit (ASICs), system on chips (SoCs), or field programmable gate arrays (FPGAs). Other examples of objectives include satisfying constraints relating to circuit area and power consumption.

In EDA tools, the behavior of the algorithms used for optimizing designs is highly non-linear and usually difficult to predict. The algorithms also involve objective functions and are usually heuristic in nature. A typical EDA tool consists of many such optimization algorithms working in sequence, which is sometimes referred to as a "flow." Each step/algorithm in the sequence typically employs a heuristic to solve a specific problem. In some cases, a specific objective or cost function is used.

The optimization algorithms involved in a design flow are often tuned using suites of benchmark designs. The tuning usually involves selecting a specific variation of heuristic and/or setting default values for various parameters that are used to guide the exploration of the solution space. Tuning for EDA tools that operate on circuit designs targeted to FPGAs can be even more complex due to the wide range and variety of designs on which the tools must effectively solve design closure objectives. A specific variation of heuristic or set of parameter settings that yields suitable results for all types of circuit designs is unattainable. As a result, EDA tools are usually enhanced from one release to the next to improve the mean or median performance relative to a benchmark suite of circuit designs. Though a new release does not guarantee that all designs will show improvement.

The complexity involved in achieving timing closure and other objectives often forces designers to perform multiple iterations through the EDA tool flow to achieve closure on a design. Changes to the circuit design are often required between iterations. The effort can sometimes be mitigated by employing multiple strategies in parallel and selecting the best result. Each strategy is a combination of specific variations of optimization heuristics and/or parameter values used in the flow. Experimenting with multiple strategies requires significant computational resources, with no guarantee that the strategy producing the best result will continue to be the most effective across tool releases.

SUMMARY

A disclosed method includes storing a plurality of strategies in a memory arrangement. Each strategy includes a set of parameter settings for a design tool. The design tool identifies a set of features of an input circuit design and applies a plurality of classification models to the input circuit design. Each classification model indicates one strategy of the plurality of strategies, and application of each classification model indicates a likelihood that use of the one strategy would improve a metric of the input circuit design based on the set of features of the input circuit design. One strategy of the plurality of strategies is selected based on the likelihood that use of the one strategy would improve the metric of the input circuit design, and the design tool is configured with the set of parameter settings of the one strategy. The design tool then processes the input circuit design into implementation data that is suitable for making an integrated circuit (IC).

A disclosed system includes one or more computer processors configured to execute program code and a memory arrangement coupled to the one or more computer processors. The memory arrangement is configured with instructions of a design tool that when executed by the one or more computer processors cause the one or more computer processors to perform operations including storing a plurality of strategies in the memory arrangement. Each strategy includes a set of parameter settings for the design tool. The design tool identifies a set of features of an input circuit design and applies a plurality of classification models to the input circuit design. Each classification model indicates one strategy of the plurality of strategies, and application of each classification model indicates a likelihood that use of the one strategy would improve a metric of the input circuit design based on the set of features of the input circuit design. One strategy of the plurality of strategies is selected based on the likelihood that use of the one strategy would improve the metric of the input circuit design, and the design tool is configured with the set of parameter settings of the one strategy. The design tool then processes the input circuit design into implementation data that is suitable for making an integrated circuit (IC).

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed approaches employ classification models to select from a large set of strategies, one or more strategies that are most likely to be effective in achieving closure on certain design constraints. In the following description, achieving timing closure is used as an exemplary application of the disclosed approaches. Those skilled in the art will recognize that the disclosed approaches can be similarly applied to achieve other objectives such as satisfying constraints related to circuit area, power consumption, routability, etc.

Machine learning techniques are used and classification models can be trained from a set of exemplary large designs. Once trained, the system can quickly identify one or more strategies likely to be suitable for achieving timing closure based on a single run of the EDA tool using a default set of parameter values. The disclosed approaches use to advantage the suite of large and realistic designs available for performance evaluation and tuning while mitigating the challenges associated with having a small number of designs available for training. For example, machine learning models in other applications such as image classification and speech recognition are trained with millions of samples. Yet in the current application, the number of designs in the training set is on the order of thousands. Challenges associated with a limited training set are overcome through the formulation of the classification problem and careful selection and engineering of model features.

The disclosed approaches can be used to identify strategies that are most likely to improve performance or improve the worst negative slack (WNS). The strategies can span all steps of the physical implementation flow, from netlist optimization, to placement, to physical synthesis and routing. As the classification models are built prior to processing of a particular user circuit design, the system can quickly identify suitable strategies, unlike other tools which explore the solution state space of a single design over several runs to choose the strategy for the next run.

A training phase and an inference phase can be employed in the disclosed approaches. For the training phase, the set of available benchmark designs can be randomly divided such that 80% of the designs can be used for training, and 20% of the designs can be used to validate the trained models.

In the exemplary application involving timing closure, a "WNS ratio" is the optimization metric. The WNS ratio is the geometric mean of the achievable frequency improvement over all clock domains in the design, weighting those domains in which the timing constraints are not satisfied. An alternative metric involving timing closure could be the improvement in the achievable frequency of the slowest clock domain in the design.

The optimization algorithms and EDA implementation flow can be guided by setting selected parameters to desired values. The parameters can emphasize or deemphasize specific aspects of a heuristic, or function as thresholds/factors in cost functions that guide exploration of the solution space by the heuristic. The set of specific settings of these parameters is referred to as a "directive" and can be a major step of the implementation flow such as logic optimization, placement, routing, or physical synthesis. An implementation flow can be built by combining different combinations of parameter settings in steps of the implementation flow. A combination of directives for the major implementation steps can be referred to as a "strategy." The disclosed approaches identify a small number of 3-5 strategies that are likely to produce the best WNS ratio for the design when compared to a default strategy.

The disclosed approaches narrow the solution search space by restricting the strategy choices to a set of approximately 40 strategies. The strategies chosen to be in the set of available strategies are those having parameter settings that have been observed by experts to be most effective in closing timing on customer designs. The set of available strategies thereby leverages hundreds of person-years of experience in resolving timing closure issues. Each strategy can target improvement of one or more aspects of the design known to make timing closure difficult, such as routing congestion, control set distribution, whitespace allocation in the placer, resource utilization of different primitives, net fanout distribution, distribution of control sets, etc.

Identifying a small number of strategies most likely to improve timing significantly reduces computational requirements. Instead of a designer having to run the EDA tool using 30 or more strategies in parallel to find a solution that meets design constraints, the designer can run the EDA tool using 3-5 strategies to find a solution. The disclosed approaches employ machine learning techniques to select strategies. The disclosed approaches also scale well with new strategies added to the pool of available choices.

Machine learning classification models depend on features and labels. A feature is a characteristic of the sample or input, which forms the basis of classification. A label is used to classify each sample design in the training set into different categories.

In the disclosed approaches, the features are divided into the following categories: device features, netlist features, and implementation flow features. Device features are characteristics of the target device on which the design is to be implemented. For exemplary target devices such as ULTRASCALE™, ULTRASCALEPLUS™, KINTEX™, VIRTEX®, and ZYNQ® devices from Xilinx, Inc., the features can include the number of input/output columns, the number of super logic regions, etc. Other target devices can have different features.

Netlist features are characteristics of the design that are independent of the behavior of the EDA tool after having run the tool through logic optimization. In the context of the aforementioned exemplary devices, examples of netlist features can include the utilization of primitives such as look-up tables (LUTs), flip-flops (FFs), block RAMs, carry chains, and digital signal processing (DSP) blocks, the number of control sets, the fanout distribution of nets, etc.

Implementation flow features can include characteristics derived from the progress of the design through the implementation flow of the EDA tool. Examples of implementation flow features can include the wirelength after global placement, the congestion after an initial routing, the worst negative slack after placement, the improvement seen in physical synthesis, etc.

In an exemplary application, the WNS ratio at the end of the implementation flow is used as the label. A margin of at least 1% is used an exemplary approach to indicate improvement with respect to the default strategy. The margin is used to reduce the chances of noise or small fluctuations in the tool optimizations producing erroneous results.

The classification models are constructed to identify the K best strategies for improving a metric of the circuit design, which in the current example is the WNS ratio. Each classification model quantifies the probability that application of the associated strategy to a circuit design having a certain set of features would improve the circuit design by at least a certain percentage. The improvement is measured relative to processing the circuit design through a design flow using a default strategy. In a scenario in which the default strategy produces results that are better than those indicated by the classification models, the tool returns a null set of strategies. In the exemplary implementation, K 5 has been shown to provide acceptable results.

Multiple classification models can be constructed for each strategy. Each classification model can be associated with a different level of improvement in the targeted metric (e.g., WNS ratio) of the design. In the exemplary application, each strategy has three associated classification models. A first model, which is denoted "M7s" for strategy s, classifies designs according to the likelihood that strategy s would produce at least a 7% improvement in the WNS ratio over the WNS ratio resulting from the default strategy. The second model, which is denoted "M5s," classifies designs according to the likelihood that strategy s would produce at least a 5% improvement in the WNS ratio, and the third model, which is denoted "M1s," classifies designs according to the likelihood that strategy s would produce at least a 1% improvement. During training, the designs in the training set are processed through the design flow using all of the available strategies, and the features of the designs are correlated with the strategies according to the levels of improvement in WNS ratio produced by the strategies.

The disclosed approaches employ a random forest model to implement the classification models. Alternative binary classification models that could be used in the disclosed methods and systems and include decision trees, boosted trees, warm-start classification methods, support vector machines, or convolutional neural networks. In the inference phase, the design is processed through one iteration of the design flow using a default strategy, such that the design was routed successfully but timing constraints have not been satisfied. Once the initial run is complete, the design can be classified using the classification models M7s, M5s, and M1s for each strategy s.

Thus, in the example involving classification models M7s, M5s, and M1s for each strategy s, the resulting classification of the design will indicate that application of the strategy s is likely to improve the WNS ratio by at least 7%, or improve the WNS ratio by at least 5% but less than 7%, or improve the WNS ratio by at least 1% but less than 5%, or not improve the WNS ratio at all.

Once the design has been classified for each strategy, an aggregation algorithm is executed to select the K strategies that are most likely to improve the design. According to an exemplary approach, a combination of the probability of model correctness and the percentage improvement in WNS ratio are used to order the strategies from most likely to improve the design to least likely to improve the design.

Figure 1:
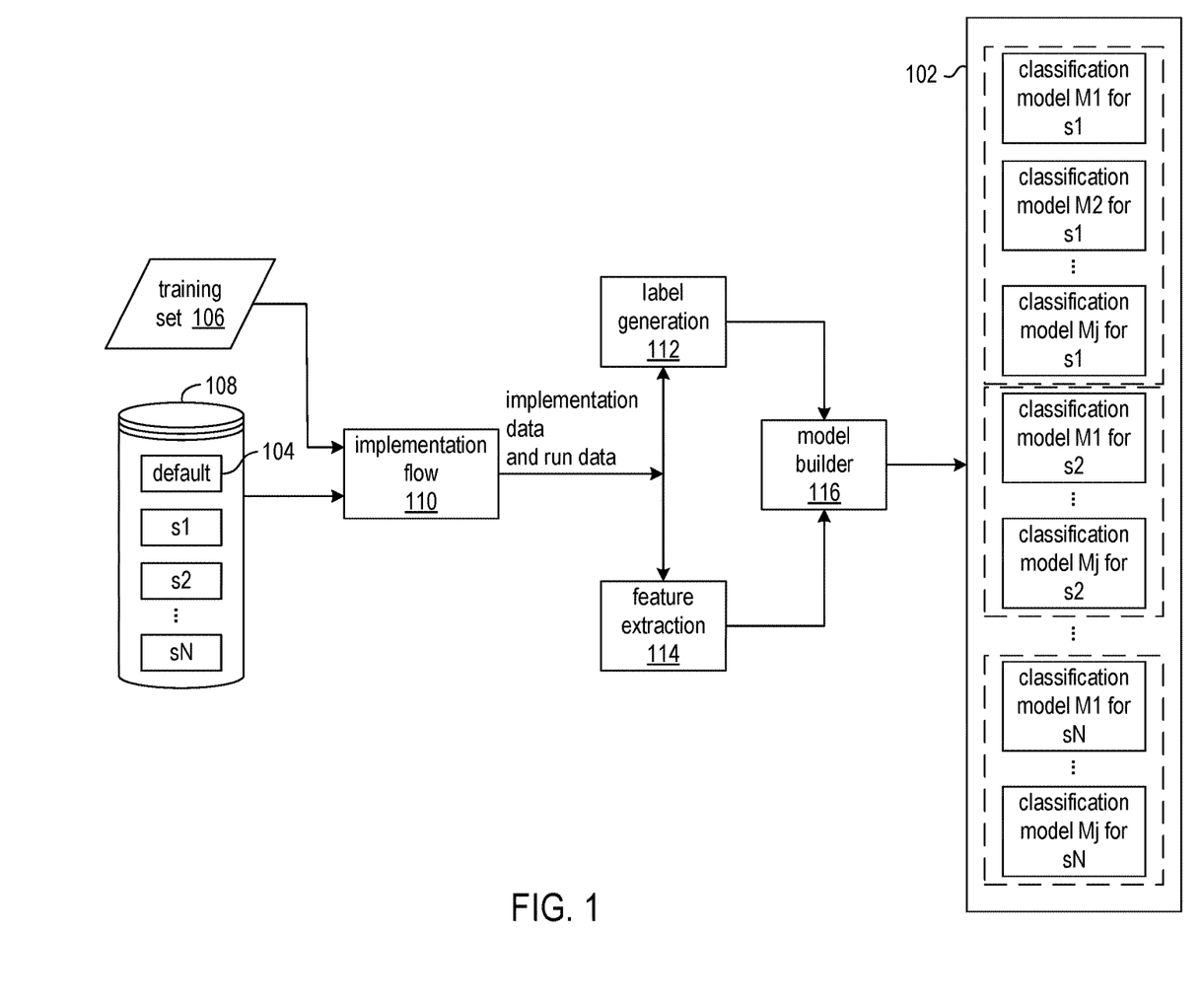
FIG. 1 shows a data flow and process flow for creating classification models that can be used in to select strategies for improving a metric of a circuit design.

FIG. 1 shows a data flow and process flow for creating classification models that can be used in to select strategies for improving a metric of a circuit design. As indicated above, in the exemplary application the target metric is the worst negative slack (WNS) ratio. Different strategies can be used to create different classification models to improve metrics other than the WNS ratio.

In constructing the classification models 102, a default strategy 104 and N other strategies ("s1", "s2", . . . , "sN") 108, which can be targeted to the metric of circuit design to be improved, are applied to each sample circuit design in a training set 106. The default strategy is applied first to the sample circuit designs in the training set in order to establish a baseline against which application of the other strategies s1-sN can be evaluated. The implementation flow 110 is performed on each of the sample circuit designs in the training set using the default strategy. The implementation flow process can be performed by one or more circuit design tools (collectively, "circuit design tool") that perform netlist optimization, placement, physical synthesis, and routing. The implementation flow outputs circuit implementation data and run data.

The implementation data can specify characteristics of the target device on which the design is to be implemented, netlist features, the circuit structures (e.g., "primitives") to be used in making an operable circuit, connections between the circuit structures, etc. The run data can include data such as wirelength after global placement, the congestion after an initial routing, the WNS after placement, the improvement seen in physical synthesis, the time spent routing the circuit design, etc.

The WNS data resulting from application of the default strategy to the circuit designs in the training set 106 can be provided to the label generation process 112, and the label generation process can generate baseline WNS ratios associated with the circuit designs in the training set. That is, each circuit design can have an associated baseline WNS ratio resulting from application of the default strategy. The baseline WNS ratios are provided to the model builder process 116 for use when strategies s1-sN are applied to the training set.

After performing the implementation flow 110 using the default strategy 104, the implementation flow is performed using each of the strategies s1-sN on each of the sample circuit designs in the training set 106. The implementation data and run data resulting from application of the strategies to the sample circuit designs are provided as input to the label generation process 112 and to the feature extraction process 114.

One exemplary strategy can specify a default directive to an optimization phase, a directive to aggressively spread the logic during a placement phase, and a routing directive to choose alternative routing algorithms that require extra runtime but may help resolve routing congestion. Another exemplary strategy can specify a default directive to an optimization phase, a directive to use an alternative set of algorithms for timing-driven placement during later stages/ and a routing directive to prevents the router from relaxing timing to complete routing (if the router has difficulty meeting timing, it runs longer to try to meet the original timing constraints). Another exemplary strategy can specify a directive to merge equivalent drivers in a logic optimization phase, a directive to aggressively spread the logic during a placement phase, a directive to aggressively explore different algorithms in multiple passes of physical optimization, including replication for very high fanout nets, and phase in which a subset of physical optimizations are run on the top critical paths of all endpoint clocks, regardless of slack. The strategy can further specify an explore directive that instructs the router phase to explore different critical path placements after an initial route.

A strategy can also take advantage of internal features of a design tool that a designer may not be given access to. For example, one internal feature of the design tool can limit the number of cells moved across clock regions during detailed placement. Another internal feature can limit the number of tiles having high pin density, and another internal feature can use congestion estimates during iterations of the routing phase.

The label generation process determines the respective levels of improvement in the WNS ratio achieved by application of the strategies to each sample circuit design relative to the baseline WNS ratio associated with that sample circuit design. Thus, for each strategy applied to a particular design in the training set, the label generation process determines the level of improvement in the WNS ratio achieved by application of the strategy to that particular sample design relative to the baseline WNS ratio associated with that sample design. The feature extraction process identifies for each sample circuit design an associated set of features exhibited by the implementation data generated by the implementation flow. The quantified level of improvement and the associated feature set are provided as input to the model builder process 116.

The model builder builds binary classification models 102, such as a random forest, according to the input levels of improvement and associated feature sets. Each classification model is associated with one of the strategies, and each strategy can have multiple classification models in the exemplary approach. The exemplary classification models include models M1-Mj for strategy s1, models M1-Mj for strategy s2, . . . and models M1-Mj for strategy sN. Once constructed, each of the classification models 102 indicates a probability that use of the associated strategy would improve a metric (e.g., a WNS ratio) of a circuit design having a particular feature set by at least the amount associated with the classification model. An alternative approach can have a single classification model per strategy.

Figure 2:
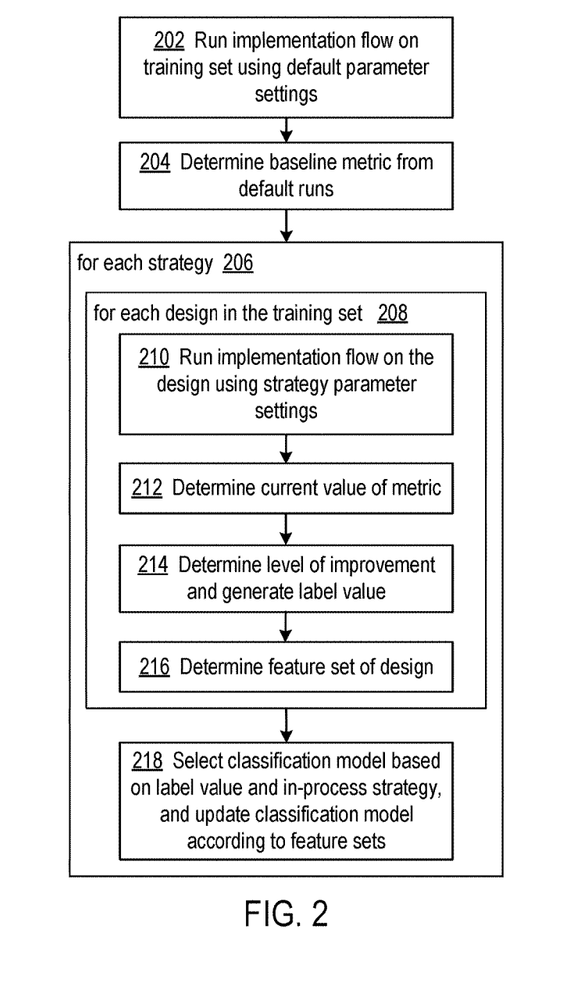
FIG. 2 shows a flowchart of a process for preparing the classification models in accordance with an exemplary approach.

FIG. 2 shows a flowchart of a process for preparing the classification models 102 in accordance with an exemplary approach. At block 202, the implementation flow process 110 is run on each circuit design in the training set using a default strategy having default parameter settings. The application of the default strategy is used to establish a baseline against which application of the other strategies s1-sN to circuit designs outside the training set can be evaluated.

At block 204, the label generation process 112 determines baseline values of the targeted metric (e.g., WNS ratio) based on the implementation flow processing the designs in the training set using the default strategy. The baseline WNS ratio determined for sample design T, can be expressed as:

$$\text{WNS ratio}_T = c\text{-root}(\text{WNS}_1 * \text{WNS}_2 * \text{WNS}_3 * \ldots * \text{WNS}_C)$$

where sample design T has C clock domains, and "c-root" indicates a function that computes the $C^{th}$ root of the input.

At block 206, the in-process strategy is applied to each design in the training set 106 (FIG. 1) according to the process of block 208. At block 210, the implementation flow process 110 is performed on a design ("in-process design") of the training set using one of the strategies ("in-process strategy") s1-sN. At block 212, the label generation process 112 (FIG. 1) determines the current value of the metric based on the data from the implementation flow in which the in-process strategy was applied to the in-process sample design. From the current value of the metric, the label generation process at block 214 determines the level of improvement in the metric relative to the baseline value of the metric associated with the in-process sample design. In the exemplary application, the level of improvement is indicated by the percentage improvement in the WNS ratio, which can be expressed as:

$$((\text{WNS ratio}_{current} - \text{WNS ratio}_{baseline})/\text{WNS ratio}_{baseline}) * 100\%$$

At block 214, the label generation process also generates the label value based on the level of improvement in the target metric. In an exemplary approach, each label corresponds to a range of improvement. As applied to the WNS ratio, for example, one label corresponds to an improvement in the WNS ratio of at least 7% over the baseline WNS ratio (resulting from the default strategy, another label corresponds to an improvement in the WNS ratio of at least 5% and less than 7% over the baseline WNS ratio, another label corresponds to an improvement in the WNS ratio of at least 1% and less than 5% over the baseline WNS ratio, and another label corresponds to an improvement in the WNS ratio of less than 1% over the baseline WNS ratio.

The feature extraction process 114 (FIG. 1) determines the respective feature set of the in-process design at block 216 by searching the data from the implementation flow process of block 210 for characteristics relevant to the classification models 102.

At block 218, the model builder process 116 (FIG. 1) determines the parameters of the classification model and/or selects the classification model itself based on the label value and the strategy that resulted in the label value, and updates the classification model based on the respective feature sets of the designs in the training set.

Figure 3:
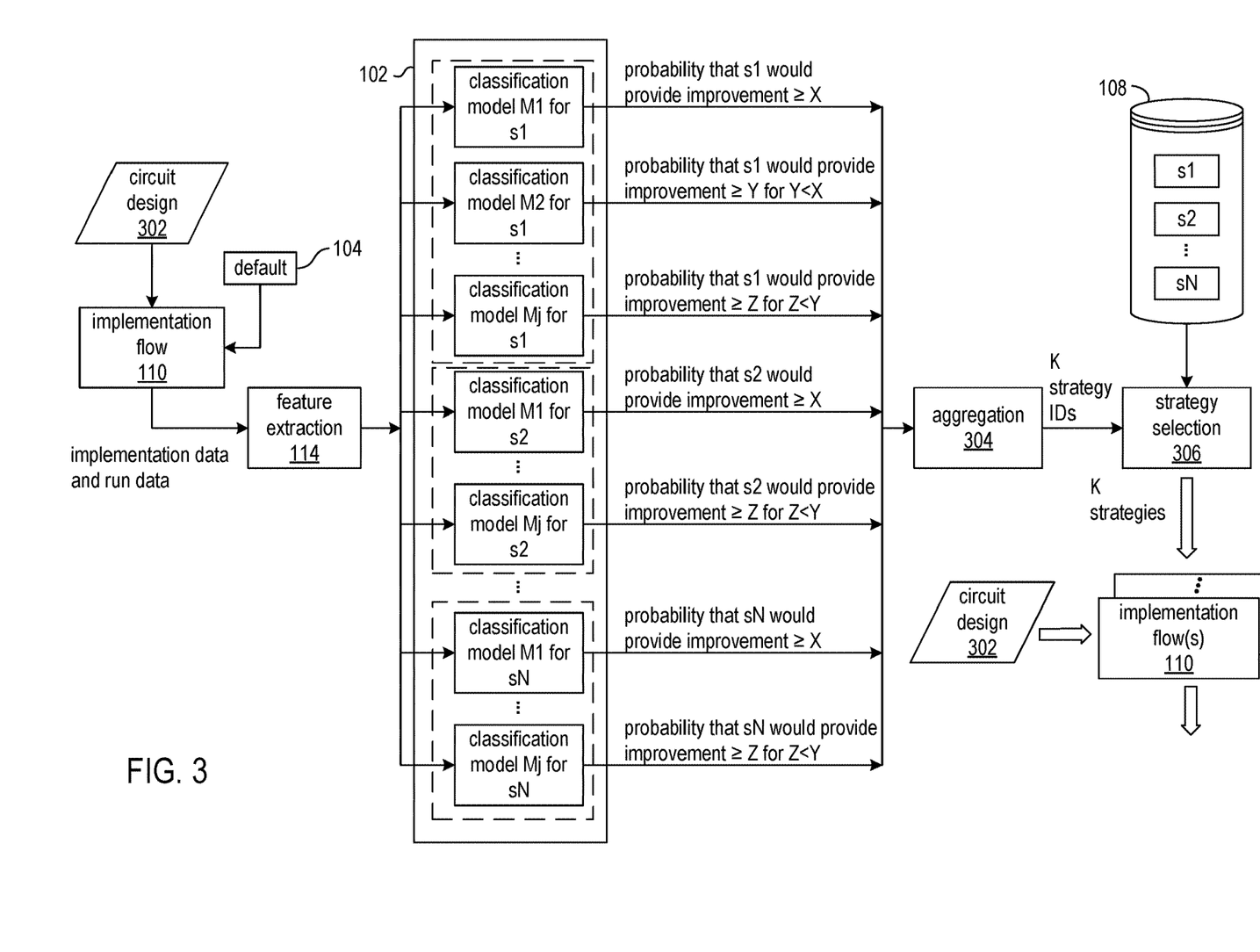
FIG. 3 shows a data flow and a process flow for selecting one or more strategies to apply to a circuit design in order to improve a target metric of the circuit design.

FIG. 3 shows a data flow and a process flow for selecting one or more strategies to apply to a circuit design in order to improve a target metric of the circuit design. The input circuit design 302 is an exemplary circuit design that fails to satisfy a certain constraint, and one or more of strategies s1-sN may be helpful in resolving the issue. For example, the circuit design 302 may have setup time violations.

The circuit design is processed through implementation flow process 110 using the default strategy 104 (FIG. 1). The implementation data and run data generated by the implementation flow process are provided to the feature extraction process 114. The feature extraction process determines a feature set from the implementation data and run data and inputs the feature set to the classification models 102.

The classification models 102 are applied to the input feature set, and each of the classification models, outputs a probability that the associated strategy would improve the target metric. In the specific exemplary approach, each of the classification models outputs a probability that the associated strategy would improve the target metric by an amount within a certain range. For example, the classification model M1 for strategy s1 outputs a probability that application of strategy s1 would improve the targeted metric more than X, the classification model M2 for strategy s1 outputs a probability that application of strategy s1 would improve the targeted metric at least by Y but less than X, etc.

An aggregation process 304 is performed on the output probabilities in order to rank the strategies in order from most likely to least likely to improve the targeted metric, factoring in the amounts by which the different strategies might improve the metric. The strategy selection process 306 reads the one or more (K) strategies of strategies 108 to apply to the circuit design 302.

The selected K strategies are individually applied to the circuit design 302 by configuring the design tool(s) with the parameter settings of each selected and performing the implementation flow process 110. Multiple implementation flow processes can be performed in parallel to apply the K strategies to the circuit design if sufficient computational resources are available. Otherwise, multiple implementation flow processes can be performed sequentially if sufficient computational resources are not available. The implementation data and run data resulting from application of the selected strategies by each of the implementation flows can be analyzed to determine if any of the strategies satisfied the constraint.

Figure 4:
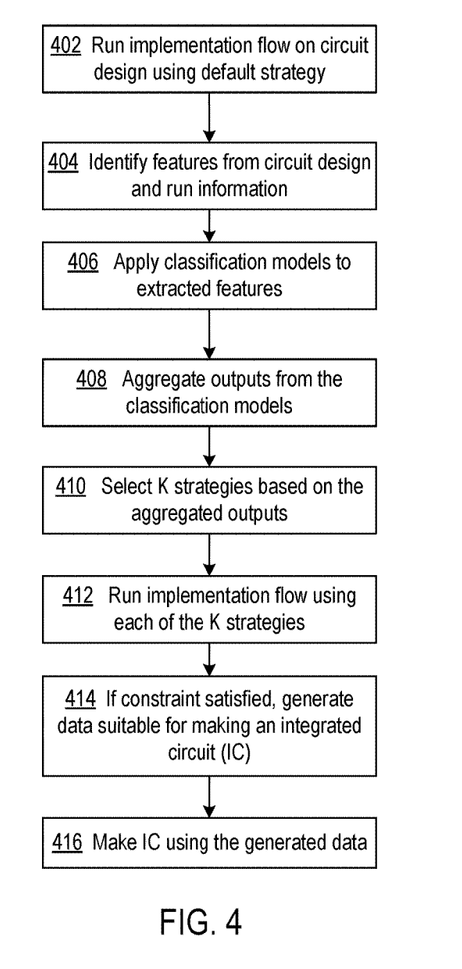
FIG. 4 shows a flowchart of a process in which one or more strategies are automatically selected and applied to a circuit design that fails to satisfy a constraint.

FIG. 4 shows a flowchart of a process in which one or more strategies are automatically selected and applied to a circuit design (the "current circuit design") that fails to satisfy a constraint. At block 402, the implementation flow process is performed on the current circuit design using the default strategy. The feature set of the current circuit design is identified at block 404 by the feature extraction process 114 (FIG. 1).

Blocks 406, 408, and 410 apply the classification models and select from the available strategies 108 (FIG. 1), a list of strategies based on how effective applications of the strategies are likely to be. At block 406, a design tool applies the classification models to the feature set identified in block 404. Each classification model is associated with one strategy of the multiple strategies 108 (FIG. 1) available for configuring parameters associated with the implementation flow process. The application of a classification model to the feature set of the current circuit design indicates the likelihood that application of the associated strategy would improve the target metric of the circuit design. In an exemplary application, the likelihood is specified by a probability that application of the strategy would improve the circuit design by a range quantified by percentages. For example, application of one classification model to a feature set can indicate the probability that application of the strategy would improve the circuit design having the feature set by at least 5% but less than 7%.

Figure 5:
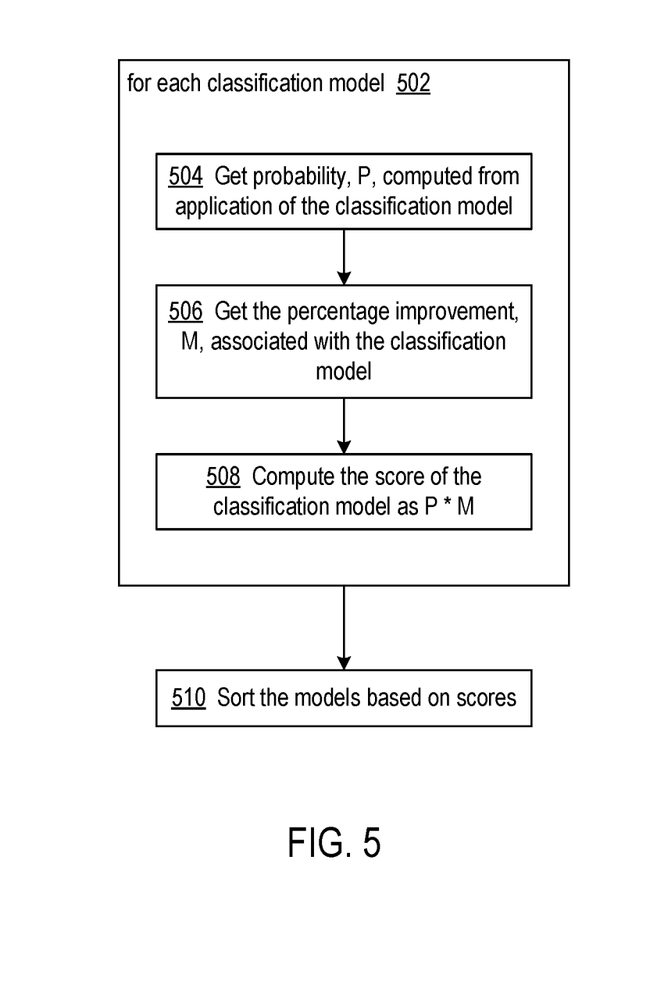
FIG. 5 shows a flowchart of a process that aggregates the outputs of the classification models.

The design tool at block 408 aggregates the outputs from the classification models. The aggregation process sorts the strategies in order of how effective the strategies are likely to be in improving the target metric. FIG. 5 shows an exemplary approach for aggregating the outputs of the classification models. As each strategy can have multiple associated classification models and each classification model can present a different probability that the application of associated strategy can provide a different level of improvement, simply selecting one or more strategies for which the associated classification models output the greatest probabilities may not provide the most useful strategies. For example, if the greatest probabilities are those indicated by classification models that are associated with the smallest possible improvements in the target metric, application of the strategies associated with those classification models may not provide the needed level of improvement. The aggregation process considers both the probabilities and the levels of improvement indicated by the classification models in ranking the strategies.

At block 410, the design tool selects one or more (K) strategies from the strategies as ranked by the aggregation process of block 408, and the selected strategies are applied to the implementation flow at block 412.

At block 414, the data resulting from the runs of the implementation flow using the K strategies is analyzed to determine whether or not the targeted metric improved enough to satisfy the design constraints. If the design constraints are satisfied, the implementation data from one of the runs can be selected and further processed to generate data that is suitable for making an integrated circuit. Circuit configuration or fabrication tools (not shown) can be used to make a circuit by configuring a device having programmable logic or fabricating an application specific integrated circuit (ASIC) based on the generated data at block 416.

FIG. 5 shows a flowchart of a process that aggregates the outputs of the classification models. The process generally determines scores of the classification models based on the probabilities that the strategies associated with the classification models would improve the target metric and the percentages of improvement associated with the classification models. As indicated above, for example, application of one classification model to a feature set can indicate the probability that application of the strategy would improve the circuit design having the feature set by at least 5% but less than 7%. The percentage improvement associated with that classification model for use in the aggregation can be a percentage, M, where 5%≤M<7%.

The process of block 502 is performed for each classification model. At block 504, the design tool reads the probability, P, determined from the application of the classification model to the feature set of the current circuit design. The probability indicates the likelihood that application of the strategy associated with the classification model would improve the target metric of the circuit design by the associated percentage (or range).

At block 506, the design tool reads the percentage improvement, M, associated with the classification model. The design tool at block 508 computes a score of the classification model as a product of P and M (score=P*M).

Once the scores of the classification models have been computed, at block 510 the design tool sorts the classification models by score. A greater score can indicate that the strategy associated with the classification model is better suited for improving the target metric than the strategy associated with a classification model having a lesser score.

Figure 6:
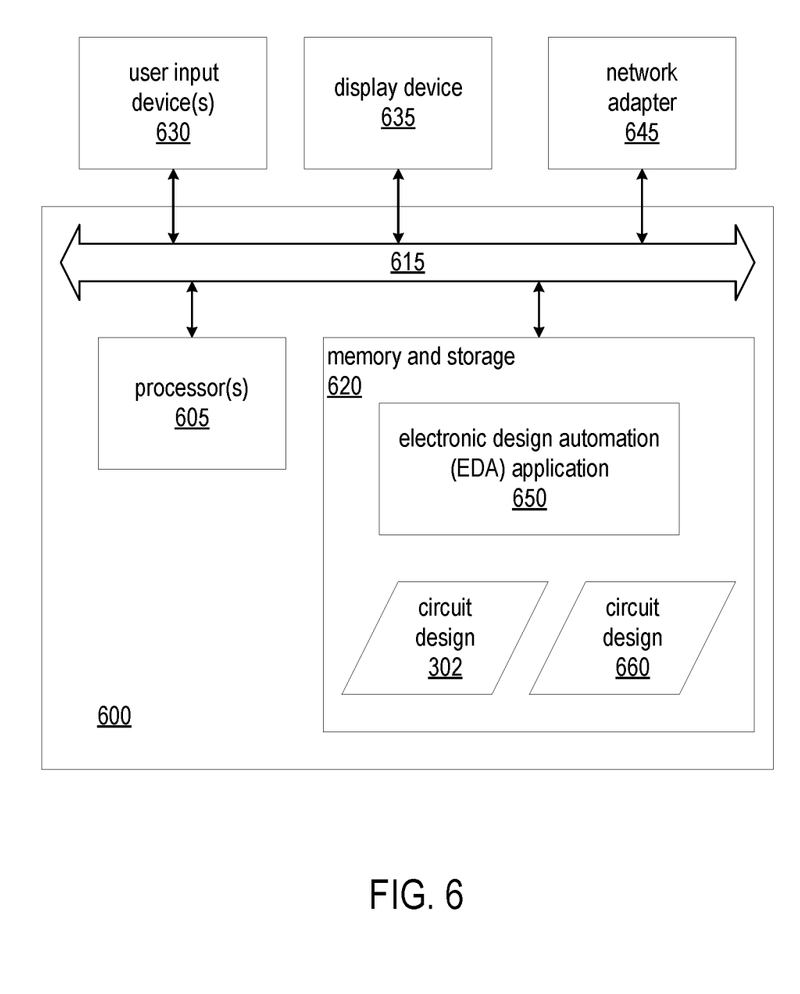
FIG. 6 is a block diagram illustrating an exemplary data processing system.

FIG. 6 is a block diagram illustrating an exemplary data processing system (system) 600. System 600 is an example of an EDA system. As pictured, system 600 includes at least one processor circuit (or "processor"), e.g., a central processing unit (CPU) 605 coupled to memory and storage arrangement 620 through a system bus 615 or other suitable circuitry. System 600 stores program code and circuit design 100 within memory and storage arrangement 620. Processor 605 executes the program code accessed from the memory and storage arrangement 620 via system bus 615. In one aspect, system 600 is implemented as a computer or other data processing system that is suitable for storing and/or executing program code. It should be appreciated, however, that system 600 can be implemented in the form of any system including a processor and memory that is capable of performing the functions described within this disclosure.

Memory and storage arrangement 620 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 600 may also include one or more cache memories (not shown) that provide temporary storage of at least some program code and data in order to reduce the number of times program code and data must be retrieved from local memory and persistent storage during execution.

Input/output (I/O) devices such as user input device(s) 630 and a display device 635 may be optionally coupled to system 600. The I/O devices may be coupled to system 600 either directly or through intervening I/O controllers. A network adapter 645 also can be coupled to system 600 in order to couple system 600 to other systems, computer systems, remote printers, and/or remote storage devices through intervening private or public networks. Modems, cable modems, Ethernet cards, and wireless transceivers are examples of different types of network adapter 645 that can be used with system 600.

Memory and storage arrangement 620 may store an EDA application 650. EDA application 650, being implemented in the form of executable program code, is executed by processor(s) 605. As such, EDA application 650 is considered part of system 600. System 600, while executing EDA application 650, receives and operates on circuit design 302. In one aspect, system 600 constructs classification models 102 (FIG. 1), performs an implementation flow on circuit design 302, and applies the classification models to the circuit design as described above. System 600 generates data suitable for making an IC as circuit design 660.

EDA application 650, circuit design 100, circuit design 660, and any data items used, generated, and/or operated upon by EDA application 650 are functional data structures that impart functionality when employed as part of system 600 or when such elements, including derivations and/or modifications thereof, are loaded into an IC such as a programmable IC causing implementation and/or configuration of a circuit design within the programmable IC.

Some implementations are directed to a computer program product (e.g., nonvolatile memory device), which includes a machine or computer-readable medium having stored thereon instructions which may be executed by a computer (or other electronic device) to perform these operations/activities Though aspects and features may in some cases be described in individual figures, it will be appreciated that features from one figure can be combined with features of another figure even though the combination is not explicitly shown or explicitly described as a combination.

The methods and system are thought to be applicable to a variety of approaches for improving circuit designs. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method comprising:
    storing a plurality of strategies in a memory arrangement, each strategy including a set of parameter settings for a design tool;
    performing an implementation flow including netlist optimization, placement, physical synthesis, and routing by the design tool using each strategy of the plurality of strategies on a training set;
    determining respective levels of improvement of a metric based on the performing of the implementation flow using the plurality of strategies on the training set;
    determining respective feature sets of circuit designs in the training set;
    configuring a plurality of classification models based on the respective feature sets and the respective levels of improvement, each classification model indicating one strategy of the plurality of strategies;
    identifying a set of features of an input circuit design;
    applying the classification models to the input circuit design by the design tool executing on a computer, wherein application of each classification model indicates a likelihood that use of the one strategy would improve the metric of the input circuit design based on the set of features of the input circuit design;
    selecting one strategy of the plurality of strategies based on the likelihood that use of the one strategy would improve the metric of the input circuit design;
    configuring the design tool with the set of parameter settings of the one strategy; and
    processing by the design tool after the configuring, the input circuit design into implementation data that is suitable for making an integrated circuit (IC).

2. The method of claim 1, wherein the application of each classification model indicates the likelihood that use of the one strategy would improve the metric of the input circuit design by at least an associated quantity.

3. The method of claim 2, wherein each strategy is associated with two or more of the plurality of classification models.

4. The method of claim 2, further comprising:
    determining respective priorities of the plurality of strategies as a function of the likelihoods and the associated quantities; and
    selecting a subset of the plurality of strategies based on the respective priorities, wherein the one strategy is one of the subset of the plurality of strategies.

5. The method of claim 2, wherein each strategy is associated with two or more of the plurality of classification models, and further comprising:
    determining respective priorities of the plurality of strategies as a function of the likelihoods and the associated quantities; and
    selecting a subset of the plurality of strategies based on the respective priorities, wherein the one strategy is one of the subset of the plurality of strategies.

6. The method of claim 1, further comprising:
    selecting two or more strategies of the plurality of strategies based on the likelihood that use of the one strategy would improve the metric of the input circuit design;
    performing an implementation flow including netlist optimization, placement, physical synthesis, and routing of the circuit design by the design tool using each of the two or more strategies;
    determining respective values of the metric based on the performing of the implementation flow using each of the two or more strategies; and
    wherein the one strategy is one of the two or more strategies that resulted in one of the respective values indicating a greatest level of improvement in the metric of the circuit design.

7. The method of claim 1, wherein the metric is based on a worst negative slack.

8. The method of claim 1, wherein the metric is estimated power consumption.

9. The method of claim 1, wherein the metric is area occupied by a circuit implemented from the input circuit design.

10. The method of claim 1, further comprising:
    determining respective values of the metric based on the performing of the implementation flow using the plurality of strategies on the training set; and
    wherein the determining respective levels of improvement of the metric includes;
    performing the implementation flow including netlist optimization, placement, physical synthesis, and routing by the design tool using a default strategy on the training set;
    determining a baseline value of the metric in response to the performing of the implementation flow on the training set using the default strategy; and
    comparing the respective levels of improvement to the baseline value.

11. The method of claim 1, wherein the configuring the classification models includes configuring the classification models as a random forest.

12. The method of claim 1, wherein the determining respective feature sets includes searching data generated by the implementation flow for characteristics indicative of one or more of a target device, netlist features, circuit structures, connections between circuit structures, wirelength, congestion, or time spent routing.

13. The method of claim 1, further comprising making an IC from the implementation data.

14. A system comprising:
one or more computer processors configured to execute program code; and
a memory arrangement coupled to the one or more computer processors, wherein the memory arrangement is configured with instructions of a design tool that when executed by the one or more computer processors cause the one or more computer processors to perform operations including:
storing a plurality of strategies in the memory arrangement, each strategy including a set of parameter settings for the design tool;
performing an implementation flow including netlist optimization, placement, physical synthesis, and routing by the design tool using each strategy of the plurality of strategies on a training set;
determining respective levels of improvement of a metric based on the performing of the implementation flow using the plurality of strategies on the training set;
determining respective feature sets of circuit designs in the training set;
configuring a plurality of classification models based on the respective feature sets and the respective levels of improvement, each classification model indicating one strategy of the plurality of strategies;
identifying a set of features of an input circuit design;
applying the classification models to the input circuit design, wherein application of each classification model indicates a likelihood that use of the one strategy would improve the metric of the input circuit design based on the set of features of the input circuit design;
selecting one strategy of the plurality of strategies based on the likelihood that use of the one strategy would improve the metric of the input circuit design;
configuring the design tool with the set of parameter settings of the one strategy; and
processing after the configuring, the input circuit design into implementation data that is suitable for making an integrated circuit (IC).

15. The system of claim 14, wherein the application of each classification model indicates the likelihood that use of the one strategy would improve the metric of the input circuit design by at least an associated quantity.

16. The system of claim 15, wherein each strategy is associated with two or more of the plurality of classification models.

17. The system of claim 15, wherein the memory arrangement is further configured with instructions of the design tool that when executed by the one or more computer processors cause the one or more computer processors to perform operations including:
determining respective priorities of the plurality of strategies as a function of the likelihoods and the associated quantities; and
selecting a subset of the plurality of strategies based on the respective priorities, wherein the one strategy is one of the subset of the plurality of strategies.

18. The system of claim 15, wherein each strategy is associated with two or more of the plurality of classification models, and the memory arrangement is further configured with instructions of the design tool that when executed by the one or more computer processors cause the one or more computer processors to perform operations including:
determining respective priorities of the plurality of strategies as a function of the likelihoods and the associated quantities; and
selecting a subset of the plurality of strategies based on the respective priorities, wherein the one strategy is one of the subset of the plurality of strategies.

* * * * *